(12) United States Patent
Chang et al.

(10) Patent No.: US 8,983,398 B2
(45) Date of Patent: Mar. 17, 2015

(54) LOOP-THROUGH CIRCUIT

(75) Inventors: Simon Chang, Cambridge (GB); Alexander Thoukydides, Cambridge (GB); Terence Chi-Fung Kwok, London (GB)

(73) Assignee: Cambridge Silicon Radio Limited, Cambridge (GB)

( * ) Notice: Subject to any disclaimer, the term of this patent is extended or adjusted under 35 U.S.C. 154(b) by 837 days.

(21) Appl. No.: 12/907,739

(22) Filed: Oct. 19, 2010

(65) Prior Publication Data

US 2011/0261866 A1    Oct. 27, 2011

(30) Foreign Application Priority Data

Oct. 23, 2009  (GB) .................................. 0918628.9

(51) Int. Cl.
- H04B 1/38      (2006.01)
- H04B 1/40      (2006.01)
- H04W 84/12    (2009.01)
- H04W 84/18    (2009.01)
- H04W 88/06    (2009.01)

(52) U.S. Cl.
CPC ................. *H04B 1/40* (2013.01); *H04W 84/12* (2013.01); *H04W 84/18* (2013.01); *H04W 88/06* (2013.01)
USPC .............. 455/73; 370/338; 370/311; 455/275

(58) Field of Classification Search
USPC ........................................................ 455/73
See application file for complete search history.

(56) References Cited

U.S. PATENT DOCUMENTS

| | | | |
|---|---|---|---|
| 2004/0048572 A1* | 3/2004 | Godfrey | 455/41.2 |
| 2004/0048577 A1* | 3/2004 | Godfrey et al. | 455/67.11 |
| 2005/0208901 A1* | 9/2005 | Chiu et al. | 455/78 |
| 2007/0149123 A1 | 6/2007 | Palin | |
| 2007/0223430 A1* | 9/2007 | Desai et al. | 370/338 |
| 2008/0139118 A1* | 6/2008 | Sanguinetti | 455/41.2 |
| 2008/0139119 A1 | 6/2008 | Behzad et al. | |
| 2008/0299930 A1* | 12/2008 | Rofougaran et al. | 455/275 |
| 2009/0196210 A1* | 8/2009 | Desai | 370/311 |

FOREIGN PATENT DOCUMENTS

WO     2004/023747 A2    3/2004

OTHER PUBLICATIONS

Search and Examination Report corresponding UK patent application issued on Mar. 22, 2010.

\* cited by examiner

*Primary Examiner* — David Bilodeau
(74) *Attorney, Agent, or Firm* — Vorys, Sater, Seymour and Pease LLP; Vincent M DeLuca

(57) ABSTRACT

An integrated circuit includes a digital interface for connection to a host controller; an antenna connection for connection to an antenna; a radio frequency transceiver for communicating data in accordance with one or more radio communication protocols, the radio frequency transceiver being configured to communicate radio frequency signals over the antenna connection in response to data exchanged over the digital interface; and radio loop-through circuitry for exchanging radio frequency signals with another integrated circuit, the radio loop-through circuitry being configured to provide radio frequency signals received at the antenna connection to an output connection of the integrated circuit.

26 Claims, 7 Drawing Sheets

LOOP-THROUGH CIRCUIT

BACKGROUND OF THE INVENTION

This invention relates to an integrated circuit supporting a wireless communication protocol and providing a combined radio interface and/or a combined host interface for at least one other integrated circuit supporting a wireless communication protocol, and to devices comprising a plurality of integrated circuits, each supporting a different wireless communication protocol.

It is increasingly common for wireless communications devices to support multiple radio protocols. This increases the compatibility of a wireless communications device with other devices and can allow a single device to communicate in multiple radio jurisdictions, each of which may utilise a different radio protocol.

A variety of different approaches have been used to incorporate support for multiple radio protocols within a single device. The original approach, and still the most common, is to use an independent integrated circuit (IC) for each communication protocol, with each IC presenting its own RF and host interfaces. This approach can generally only be used in devices having host interfaces that intrinsically support multiple devices attached to a single host, such as a hub-based Universal Serial Bus (USB) interface. Otherwise, the host must support multiple independent interfaces, which are expensive in terms of cost, complexity and power consumption. For host interface protocols that only support point-to-point connections such an implementation requires a master 101, 102 for each communication IC 103, 104—as shown in the example given in FIG. 1.

External components are sometimes used to combine an interface of one IC with that of another so that two or more communications ICs can share an antenna or a host interface. FIG. 2 shows a common approach for sharing an antenna 205 between Bluetooth 201 and IEEE 802.11b/g 202 ICs. The arrangement allows simultaneous receive via a shared low noise amplifier (LNA) 203 and splitter 204, but exclusive transmission by means of switches 206. These additional components increase the cost of the device and generally adversely affect the performance of the radio communications.

More recently, there has been a trend to provide support for multiple radio protocols (such as Bluetooth and IEEE 802.11) in a communications device by combining the circuitry for each radio protocol into a single integrated circuit. This trend has been driven by a belief that integrating the transceivers of each radio protocol lowers the cost and PCB area used. However, this approach brings various drawbacks, most notably decreased radio frequency (RF) performance due to poorer isolation between the RF stages of the various protocols and reduced flexibility in terms of the choice of communication protocols a device can be configured to provide and the configuration of components such as antennas. Furthermore, a combination IC is rather more complex to design than individual ICs each configured to support a single communication protocol, so such combination ICs typically take longer to bring to market.

There is therefore a need for a new approach to supporting multiple wireless communication protocols at a device which combines the flexibility and performance advantages of using separate integrated circuits for each communication protocol with the cost and size benefits of combining communication circuitry together in a single integrated circuit.

SUMMARY OF THE INVENTION

According to a first aspect of the present invention there is provided an integrated circuit comprising: a digital interface for connection to a host controller; an antenna connection for connection to an antenna; a radio frequency transceiver for communicating data in accordance with one or more radio communication protocols, the radio frequency transceiver being configured to communicate radio frequency signals over the antenna connection in response to data exchanged over the digital interface; and radio loop-through circuitry for exchanging radio frequency signals with another integrated circuit, the radio loop-through circuitry being configured to provide radio frequency signals received at the antenna connection to an output connection of the integrated circuit.

Suitably the radio loop-through circuitry is further configured to provide radio frequency transmit signals received at an input connection of the integrated circuit to the antenna connection. The input and output connections may be one and the same.

Preferably the radio loop-through circuitry further comprises a low noise amplifier configured to amplify radio frequency signals received at the antenna connection for the radio frequency transceiver.

Preferably the radio loop-through circuitry is configured to selectively provide signals received at the antenna to the output connection or the radio frequency transceiver, the radio frequency transceiver being selected when the radio frequency transceiver is receiving radio frequency signals over the antenna.

Preferably the loop-through circuitry further comprises a buffer amplifier between the antenna and the output connection such that received radio frequency signals are provided to the output connection by means of the buffer amplifier.

Suitably the radio loop-through circuitry further comprises a low noise amplifier configured to amplify radio frequency signals received at the antenna connection and provide the amplified signals at both the output connection and the radio frequency transceiver.

Preferably the radio loop-through circuitry is configured to provide radio frequency signals received at the antenna connection to the output connection when the integrated circuit is in a low power mode.

Preferably the radio loop-through circuitry further comprises one or more switches operable to select between transmit signals received at the input connection and transmit signals from the radio frequency transceiver, the selected transmit signals being exclusively provided to the antenna connection. Preferably the switches are configured to select transmit signals from the radio frequency transceiver when the transceiver has signals to transmit. Preferably the said switches are configured to select transmit signals received at the input connection when the integrated circuit is in a low power mode. Preferably the said switches are further configured to provide radio frequency signals received at the antenna connection to the output connection when the integrated circuit is in a low power mode.

Suitably the radio loop-through circuitry further comprises a radio frequency mixer configured to combine transmit signals received at the input connection and transmit signals from the radio frequency transceiver.

Suitably the radio loop-through circuitry is operable to exchange radio frequency signals with one or more additional other integrated circuits.

Preferably the radio frequency transceiver comprises a power amplifier configured to amplify signals for transmission over the antenna and the radio loop-through circuitry comprises a transformer arranged to couple the output of the power amplifier to the antenna.

Preferably the digital interface is further configured to present first and second function sets and the integrated circuit further comprises interface loop-through circuitry for exchanging digital data with said other integrated circuit, the interface loop-through circuitry being configured to: provide commands of the second function set received at the digital interface at a loop-through interface connection; and provide responses received at the loop-through interface connection to the digital interface as responses of the second function set.

According to a second aspect of the present invention there is provided an integrated circuit comprising: a digital interface for connection to a host controller, the digital interface being configured to present first and second function sets; an antenna connection for connection to an antenna; a radio frequency transceiver for communicating data in accordance with one or more radio communication protocols, the radio frequency transceiver being configured to communicate radio frequency signals over the antenna connection in response to commands of the first function set received at the digital interface; and interface loop-through circuitry for exchanging digital data with another integrated circuit, the interface loop-through circuitry being configured to: provide commands of the second function set received at the digital interface at a loop-through interface connection; and provide responses received at the loop-through interface connection to the digital interface as responses of the second function set.

The radio frequency signals may represent data of the first function set exchanged over the digital interface.

Preferably the interface loop-through circuitry is configured to commence replication at the loop-through interface connection of each command received at the digital interface but abort those commands which are not indicated as being of the second function set. Alternatively, the interface loop-through circuitry is configured to buffer part of each command received at the digital interface sufficient to determine to which function set the command belongs and on the basis of that determination route commands of the second function set to the loop-through interface connection.

Suitably the digital interface is further configured to present a third function set and (a) the transceiver is responsive to commands of the third function set received at the digital interface, and (b) the interface loop-through circuitry is configured to provide commands of the third function set received at the digital interface to the loop-through connection.

Preferably the digital interface is an SDIO interface and the function sets are SDIO functions.

Preferably the interface loop-through circuitry is operable to exchange digital data with one or more additional other integrated circuits, the interface loop-through circuitry including an additional loop-through interface connection for each additional integrated circuit.

According to a third aspect of the present invention there is provided an integrated circuit comprising: a digital interface for connection to a host controller; an antenna connection for connection to an antenna; a radio frequency transceiver for communicating data in accordance with one or more radio communication protocols, the radio frequency transceiver being configured to communicate radio frequency signals over the antenna connection in accordance with data exchanged over the digital interface; and digital loop-through circuitry for exchanging digital data with another integrated circuit, the digital loop-through circuitry being configured to provide digital data demodulated at the radio frequency transceiver from radio frequency signals received at the antenna connection to a digital loop-through connection.

Preferably the digital loop-through circuitry is further configured to provide digital data received for transmission at the digital loop-through connection to the radio frequency transceiver, the radio frequency transceiver being configured to modulate digital data received at the digital loop-through connection into radio frequency signals for transmission at the antenna connection.

According to a fourth aspect of the present invention there is provided an electronic device comprising: an antenna; a host controller; a first integrated circuit comprising: a first digital interface coupled to the host controller; a first radio frequency transceiver for communicating data by means of one or more first radio communication protocols, the first radio frequency transceiver being configured to communicate radio frequency signals over the antenna in response to data exchanged over the digital interface; and radio loop-through circuitry for exchanging radio frequency signals with a second integrated circuit, the radio loop-through circuitry being configured to provide radio frequency signals received at the antenna to the second integrated circuit; the second integrated circuit comprising a second radio frequency transceiver for communicating data in accordance with one or more second radio communication protocols, the second radio frequency transceiver being configured to receive radio frequency signals over the antenna by means of the radio loop-through circuitry.

Suitably the second radio frequency transceiver of the second integrated circuit is further configured to transmit radio frequency signals over the antenna by means of the radio loop-through circuitry, the radio loop-through circuitry of the first integrated circuit being configured to cause the transmission of radio frequency transmit signals received from the second integrated circuit over the antenna.

Preferably the first and second integrated circuits are provided in a single package.

Preferably the electronic device further comprises an independent connection between the second integrated circuit and the antenna so as to allow the second integrated circuit to receive radio frequency signals when the first integrated circuit is in a low power state.

Preferably the electronic device further comprises one or more switches provided between the antenna and the first integrated circuit and the antenna and the independent connection of the second integrated circuit, the one or more switches being arranged to select between the first and second integrated circuits such that the radio frequency transmit signals of the selected integrated circuit are exclusively provided to the antenna. Preferably the radio loop-through circuitry further comprises a switch configured to isolate the second integrated circuit from the first integrated circuit when the first integrated circuit is powered down.

Suitably the electronic device further comprises: clock generation circuitry at each of the first and second integrated circuits; a clock arranged to provide a reference clock to the clock generation circuitry at the first and second integrated circuits; clock request loop-through circuitry at the first integrated circuit configured to forward clock requests received from the clock generation circuitry of the second integrated circuit to the clock.

Suitably the electronic device further comprises: at the first integrated circuit, interface loop-through circuitry for exchanging digital data with the second integrated circuit; at the second integrated circuit, a second digital interface coupled to the interface loop-through circuitry; wherein the first digital interface of the first integrated circuit is further configured to present first and second function sets and the interface loop-through circuitry is configured to: to the second integrated circuit, provide commands of the second function set received at the first digital interface from the host controller; and to the host controller, provide responses received from the second integrated circuit as responses of the second function set.

Suitably the first digital interface of the first integrated circuit is further configured to present a third function set and (a) the first radio frequency transceiver is responsive to commands of the third function set received from the host controller, and (b) the interface loop-through circuitry is configured to provide commands of the third function set received from the host controller to the second integrated circuit.

Preferably the interface loop-through circuitry is configured to hold data relating to the state of the second digital interface and, in response to one or more predetermined commands of the third function set, respond on behalf of the second integrated circuit to the host controller. The third function set may be a global function set for controlling the first and second digital interfaces.

Preferably the digital interfaces are SDIO interfaces and the host controller is an SDIO host controller.

BRIEF DESCRIPTION OF THE DRAWINGS

The present invention will now be described by way of example with reference to the accompanying drawings, in which.

DETAILED DESCRIPTION OF THE INVENTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention is directed to techniques for combining multiple wireless communication ICs such that the combination of separate ICs is presented as a single combination IC to the available radio and/or host interfaces. This is achieved through the use of a wireless communication IC configured to provide radio and/or host interface loop-through functionality to other wireless communication ICs. This preserves the benefits of having separate ICs for different radio protocols whilst gaining many of the benefits of combining the circuitry for each radio protocol into a single IC.

Figure 1:
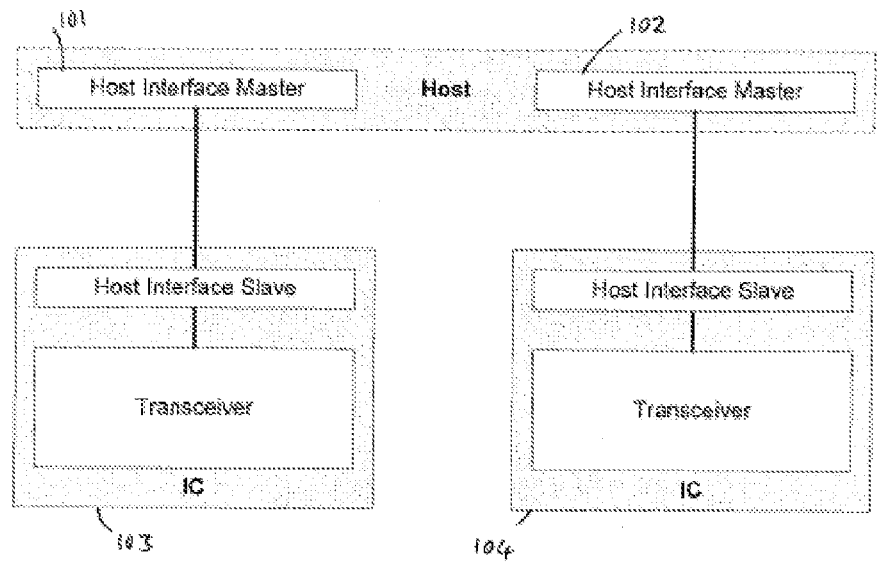
FIG. 1 is a diagram of a conventional communication device supporting a host interface for each communication IC.
Figure 2:
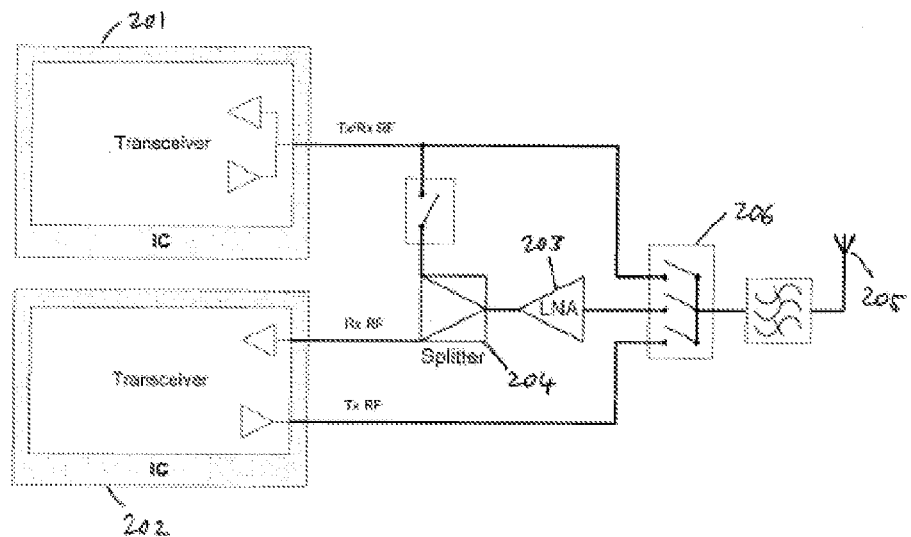
FIG. 2 is a diagram of a conventional communication device comprising two communication ICs coupled together to a single antenna.
Figure 3:
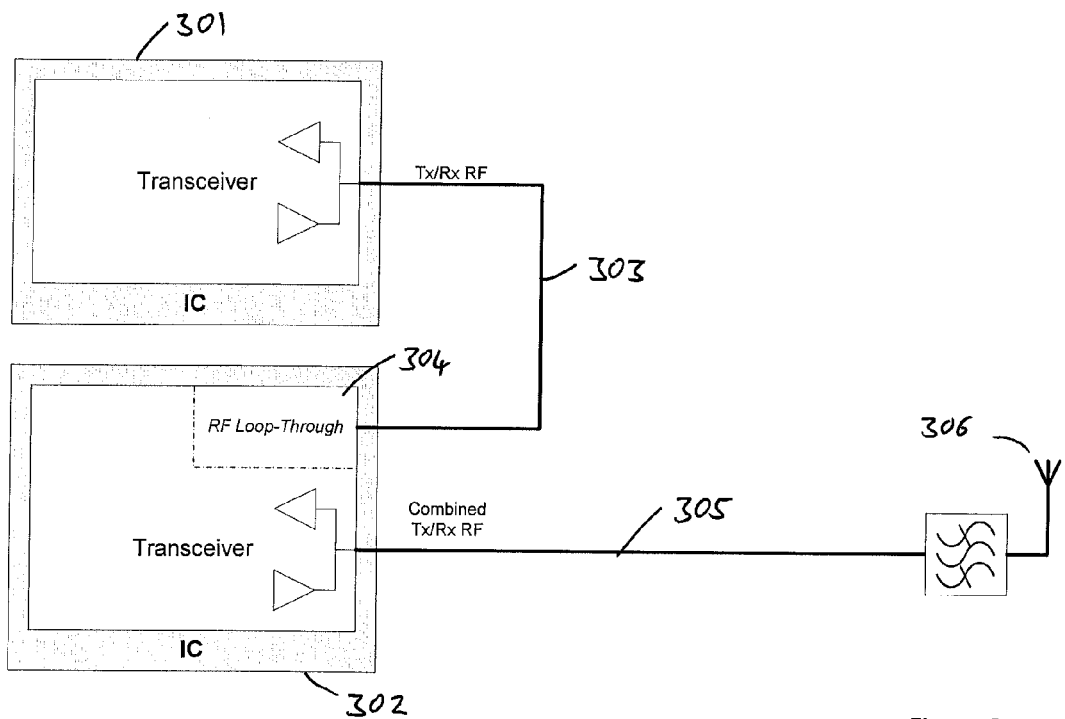
FIG. 3 is a schematic diagram of a communication device configured in accordance with a first embodiment of the present invention.

A first embodiment of the present invention is shown in FIG. 3, in which the radio frequency (RF) path 303 from one communication IC is directed via a second communication IC. In this example, the first communication IC is Bluetooth IC 301 and the second communication IC is IEEE 802.11 IC 302. IC 302 includes loop-through circuitry 304 which is operable to receive RF transmit signals from IC 301 and provide them to antenna 306 over combined RF path 305. This is preferably achieved by means of one or more switches in loop-through circuitry 304 which are controlled so as to connect whichever of the two ICs 301 and 302 are transmitting to antenna 306. Typically, for communication ICs operating in overlapping radio frequency bands (such as the 2.4 GHz ISM band for Bluetooth and IEEE 802.11b/g) a coexistence scheme will be in operation to ensure that only one of ICs 301 and 302 are transmitting at any one time.

Similarly, loop-through circuitry 304 is operable to provide radio frequency signals received at antenna 306 to IC 301. Preferably circuitry 304 allows both ICs 301 and 302 to simultaneously receive RF signals from the antenna. This may be by means of a common LNA and splitter provided in circuitry 304.

In this manner, both IC 301 and IC 302 can communicate by means of common antenna 306 without any additional external components being required (in practice some additional components may be present, such as a band pass filter to minimise out-of-band interference passed onto other radios and to filter out interference from other radios within a device comprising the ICs). Furthermore, only IC 302 needs to be modified to include loop-through circuitry 304; IC 301 can be unmodified since loop-through circuitry 304 provides a transparent RF interface to antenna 306.

In FIG. 3, the ICs are Bluetooth and IEEE 802.11 ICs but the present invention can be used to share an antenna between any wireless communication ICs. The present invention can be extended so as to share an antenna between more than two wireless communication ICs. Note that IC 301 need not be capable of transmitting radio frequency signals (for example, it could be a GPS receiver), in which case loop-through circuitry 304 need only provide a receive path RF loop-through for the IC 301. Furthermore, IC 302 need not be capable of transmitting radio frequency signals either and may be configured to communicate by only receiving radio frequency signals.

Figure 4:
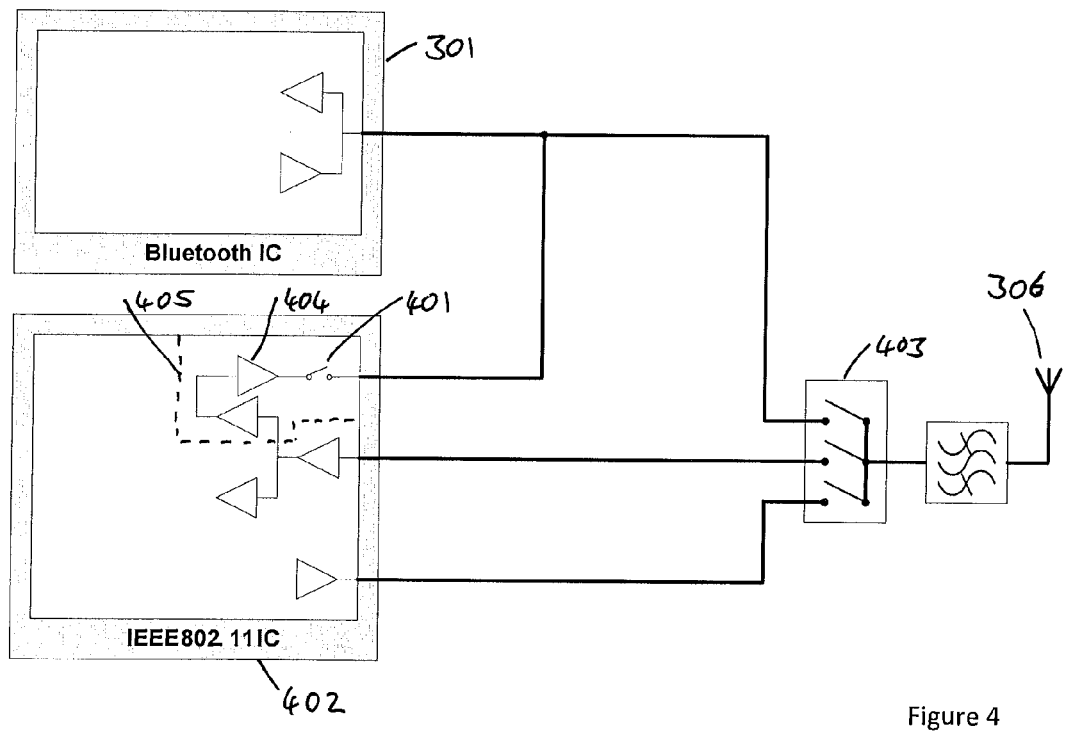
FIG. 4 is a schematic diagram of a communication device configured in accordance with a first embodiment of the present invention, each IC having an independent path to the antenna.

FIG. 4 shows an alternative implementation of the first embodiment in which at least the transmit paths of ICs 301 and 402 are switched at switch 403, which is external to the ICs. Loop-through circuitry 405 includes buffer 404 and internal switch 401. The presence of switches 403 and 404 allows Bluetooth IC 301 to continue operating even when IEEE 802.11 IC is off: by opening switch 401 and closing switch 403 between IC 301 and antenna 306, the Bluetooth IC can operate independently of IC 402. When IC 402 is powered, switch 401 is closed and received signals are passed to IC 301 via loop-through circuitry 405; transmit signals continue to be fed directly to the antenna by means of switch 403, which is preferably controlled so as to select between RF transmissions from the Bluetooth and IEEE 802.11 ICs.

The arrangement shown in FIG. 4 is also useful when the transmit power of one of the ICs is greater than may be handled at an internal switch in integrated circuit 402. For example, it can be difficult to fabricate an integrated switch capable of handling the typical power output of an IEEE 802.11 transceiver and therefore an external switch configuration might be used in wireless communication devices supporting an IEEE 802.11 radio protocol.

Figure 5:
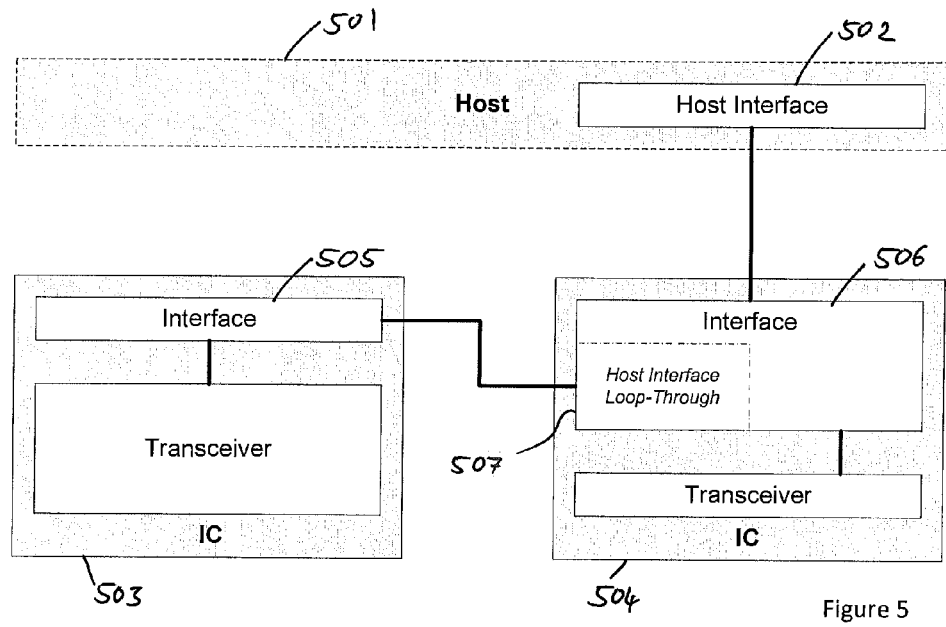
FIG. 5 is a schematic diagram of a communication device configured in accordance with a second embodiment of the present invention.

A second embodiment of the present invention is shown in FIG. 5 in which a wireless communications IC 504 is configured to provide a loop-through interface 507 to the host 501 for one or more other wireless communications ICs 503. This allows two or more radio transceivers to share a single host interface 502. Furthermore, the use of a loop-through interface allows multiple radio transceivers to utilise a single interface even if the interface type used does not support multiple devices. For example, the present invention allows multiple radio transceivers to be addressed over a single Secure Digital Input Output (SDIO) interface operating in accordance with the SDIO Specification developed by the SD Association.

Interface 505 of IC 503 need not be modified because the interface loop-through circuitry 507 within interface 506 of IC 504 is configured to forward commands and responses between IC 505 and host interface 502. Thus, only one IC need be modified in order to support two or more communication ICs over the host interface, with the interface of that IC being configured to forward commands and response between other communication ICs and the host.

In order for the host interface to distinguish between the different communication ICs, the interface protocol must allow a single device to support multiple function sets (referred to as functions in the SDIO specification). Each function may then correspond to a different IC. In other words, parent IC 504 presents at least two functions to host interface 502: a first function which corresponds to the radio protocol supported at the parent IC, and a second function which corresponds to the radio protocol supported at IC 503. If there are additional communication ICs supporting further radio protocols, the parent IC presents additional functions such that each IC can independently communicate with the host interface. In this manner, the host interface 502 can direct its commands to the appropriate IC and the IC at which the responses to those commands originate can be correctly identified by the host interface.

Figure 6:
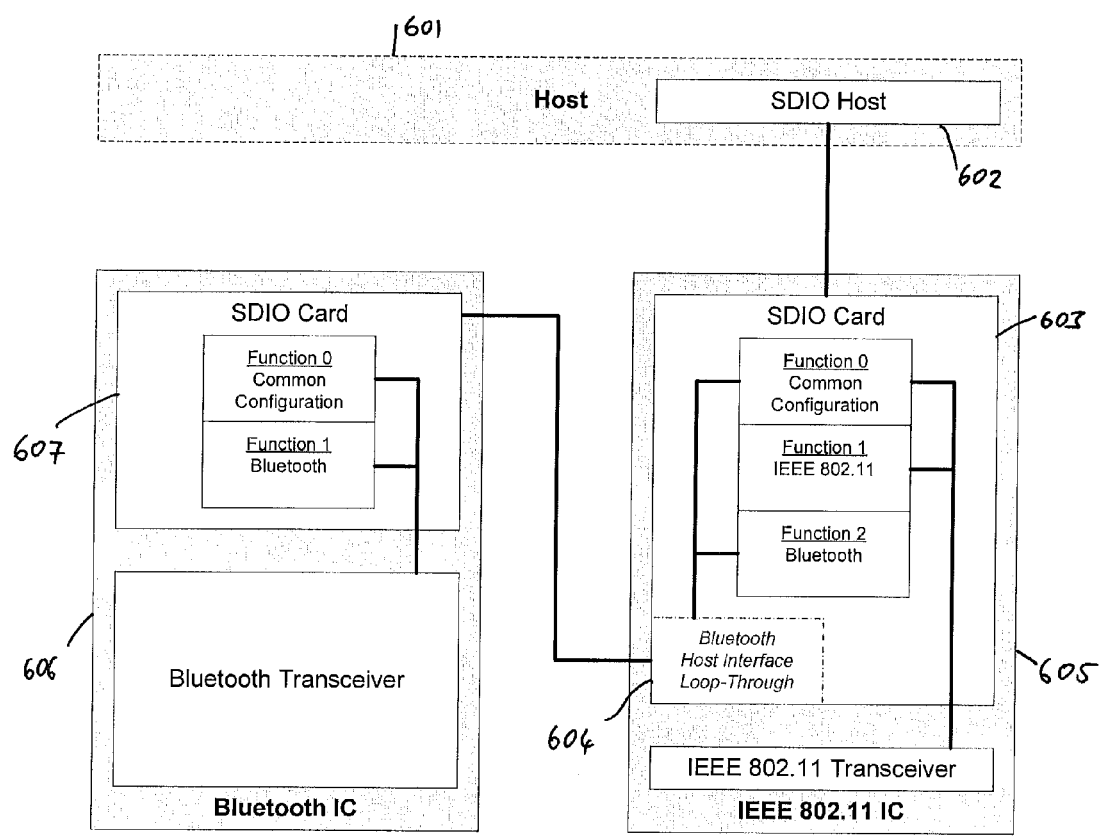
FIG. 6 is a schematic diagram of a communication device configured in accordance with a second embodiment of the present invention, the device supporting an SDIO interface between host and IC.

FIG. 6 shows an exemplary implementation of the second embodiment of the present invention in which a host device includes two discrete radio communication ICs, Bluetooth IC 606 and IEEE 802.11 IC 605, both of which are supported by a single SDIO host interface 602. IC 605 provides the interface loop-through 604 for IC 606 and presents three functions to the host: function 0 which provides global control for the wireless communications ICs; function 1 which provides control over the IEEE 802.11 transceiver; and function 2 which provides control over the Bluetooth transceiver. The function corresponding to a particular radio transceiver provides the control and data planes appropriate to that transceiver.

Global and IEEE 802.11 commands received from the host are handled at the IEEE 802.11 transceiver in the normal manner, but interface loop-through 604 is configured to forward all Bluetooth function 2 commands onto the Bluetooth IC along with any relevant global function 0 commands. Bluetooth IC 606 presents a standard SDIO interface 607 with only two functions: global function 0 and Bluetooth function 1 (it is not necessary for the same function numbers to be allocated to the same radio protocols on each IC). IC 606 handles global and Bluetooth commands received from host 601 in the normal manner because the interface loop-through is transparent to the Bluetooth IC.

Since the SDIO specification supports up to eight functions (including the global control provided by function 0), this architecture allows a communication IC comprising interface loop-through circuitry 604 to support up to six additional communication ICs.

With SDIO, the host 601 initiates all operations. Each operation consists of a command from host interface 602, a response from the card (a transceiver IC in this case) and an optional data transfer phase in which digital data for transmission by the RF transceiver may be provided and by which received data can be supplied to the host. Interface loop-through circuitry 604 analyses commands received from the host interface to identify the function number being addressed. For accesses to the Bluetooth loop-through function 2, the interface loop-through will forward the command and any subsequent response or data transfer between the host and the Bluetooth IC. The loop-through interface can either perform buffering of a command to allow extraction of the function number before forwarding the relevant commands, or it can replicate all commands bit-for-bit as they are received but abort those which are subsequently identified as being commands that are not for forwarding. In the latter case the standard error detecting mechanisms of the SDIO protocol will ensure that the partially forwarded commands are safely ignored.

Global function 0 typically contains a mixture of read-only details about a transceiver and its functions, including read-only status information and modifiable configuration settings. Preferably the parent IC (in this case the IEEE 802.11 IC) handles those function 0 operations which do not require live access to the Bluetooth IC. This can be achieved by storing information about the Bluetooth function at the interface loop-through. The interface loop-through can update this information periodically by snooping responses returned from function 0 of the Bluetooth IC. Alternatively, this information can be configured on power-up of the device or initialization of the Bluetooth IC. Those function 0 operations which require live access to the Bluetooth IC are forwarded to the Bluetooth IC for handling at its function 0.

Other SDIO features can be handled using natural extensions of the above techniques. For example interrupt requests from the Bluetooth IC can be fed into the IEEE 802.11 IC's SDIO interrupt controller (part of SDIO interface 603), setting the appropriate status bit in function 0 and asserting its interrupt request to the host. The host's subsequent write to function 0 to clear the interrupt can then be passed through to the Bluetooth IC (with appropriate function number remapping). In this manner the IEEE 802.11 IC can provide a transparent interface loop-through for the Bluetooth IC.

It is most advantageous if the first and second embodiments of the present invention are combined so as to provide a collection of discrete communication ICs having common radio and host interfaces. Such an arrangement benefits from the advantages of having a shared radio interface and the advantages of having a shared host interface, as discussed above. In many practical implementations it can be further advantageous if the communication ICs use the established technique of clock sharing. This reduces the need for additional clocks which consume power and PCB space in a device and add to the complexity of its design.

Figure 7:
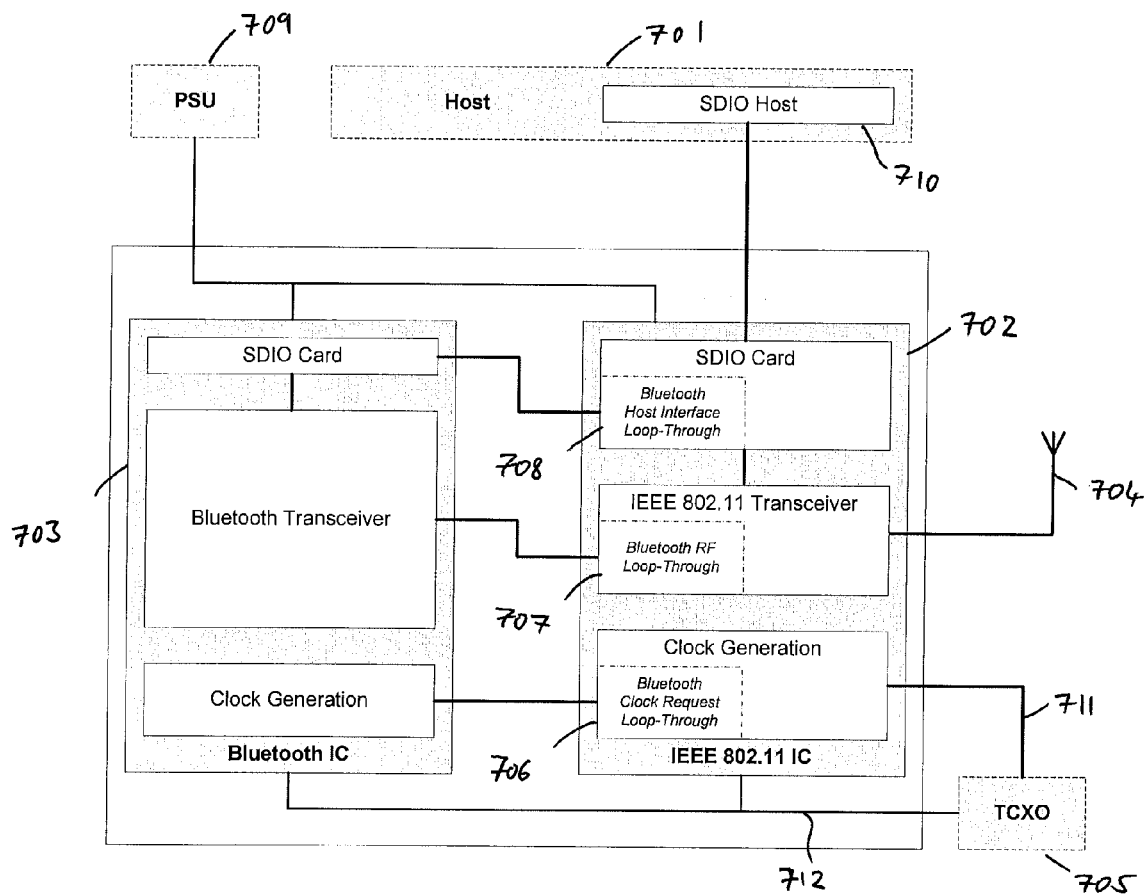
FIG. 7 is a schematic diagram of a communication device configured in accordance with the first and second embodiments of the present invention.

An implementation of the present invention combining the first and second embodiments and clock sharing between the communication ICs is shown in FIG. 7. In the example, an IEEE 802.11 IC 702 provides loop-through circuits for the host interface, Bluetooth RF and clock request. The loop-through circuits 706, 707 and 708 are provided to a second communication IC, in this case Bluetooth IC 703. RF loop-through circuitry 707 provides a connection for radio frequency transmit/receive between Bluetooth IC 703 to antenna 704 in the manner described above in relation to the first embodiment. Host interface loop-through 708 is configured to forward commands and responses sent between Bluetooth IC 703 and host interface 710 in the manner described above in relation to the second embodiment. The interface shown in FIG. 7 is an SDIO interface, with ICs 702 and 703 presenting themselves as SDIO cards. Typically the two ICs 702 and 703 will share a power supply unit (PSU) 709.

Clock 705 (which is shown in FIG. 7 as a temperature controlled oscillator, or TXCO) provides a reference clock 712 to ICs 702 and 703. As is typical for clocks provided for digital ICs, each IC requires access to clock interface 711 of the clock, by means of which an IC can request provision of a reference clock. Clock request loop-through circuitry 706 is configured to pass clock requests between clock generation circuitry of Bluetooth IC 703 to interface 711 of the clock 705.

The present invention has been described in relation to the example of an IEEE 802.11 b/g 'proxy' IC performing I/O loop-through for a Bluetooth 'client' IC sharing a single 2.4 GHz antenna and a single SDIO host interface. However, the present invention is in no way limited to such an implementation and can be used wherever it is advantageous to interface to a collection of discrete communication ICs as though the collection were a single IC combining the communication protocols of the discrete parts. In particular, the present invention can be applied when other antenna sharing arrangements are in use, not just those supporting simultaneous receive and exclusive transmit.

Figure 8:
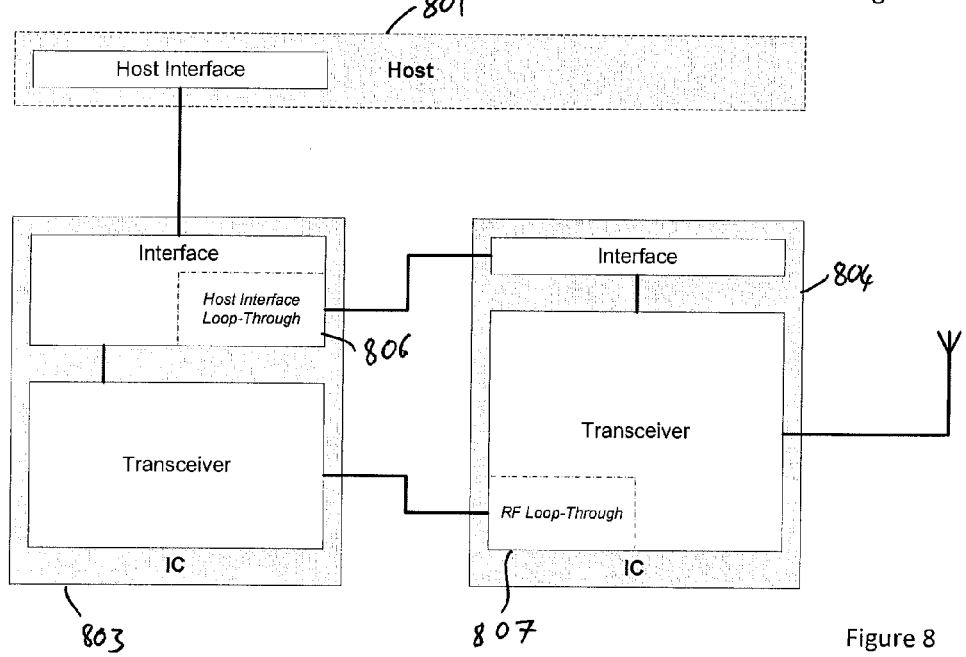
FIG. 8 is a schematic diagram of a communication device configured in accordance with the first and second embodiments of the present invention, each of the two ICs supporting I/O loop-through circuitry.

The techniques comprising this invention do not need to be implemented in a strictly hierarchical manner with all I/O loop-throughs being provided by a single IC. For example in the case of a Bluetooth IC and an IEEE 802.11 IC it would be possible for the Bluetooth IC to implement an SDIO host interface loop-through and the IEEE 802.11 IC to implement an RF loop-through. This arrangement is shown in FIG. 8. The Bluetooth IC 803 provides host interface loop-through circuitry 806 for IEEE 802.11 IC 804 in the manner described above in the discussion of the second embodiment of the present invention. This allows both ICs to communicate with host 801. IEEE 802.11 IC 804 provides RF loop-through circuitry 807 for Bluetooth IC 803 in the manner described above in the discussion of the first embodiment of the present invention.

Several approaches have been described for providing RF and host interface loop-through circuits in an IC. When more than two radio protocols are provided by two or more ICs, different approaches may be used with different combinations of the protocols. For example, Bluetooth in combination with IEEE 802.11 b/g may be implemented in a simultaneous receive, exclusive transmit arrangement, but Bluetooth in combination with IEEE 802.11a may perform both receive and transmit simultaneously because the 2.4 GHz Bluetooth frequency band and the 5 GHz IEEE 802.11a frequency band do not overlap. Similarly, if multiple host interface protocols are supported then different approaches could be adopted for each protocol. Depending on the characteristics of the host interface protocol its loop-through can either operate in a transparent mode with raw bus transactions forwarded in real time (possibly with a small number of clock cycles delay) or with buffering of higher-layer operations.

Figure 9:
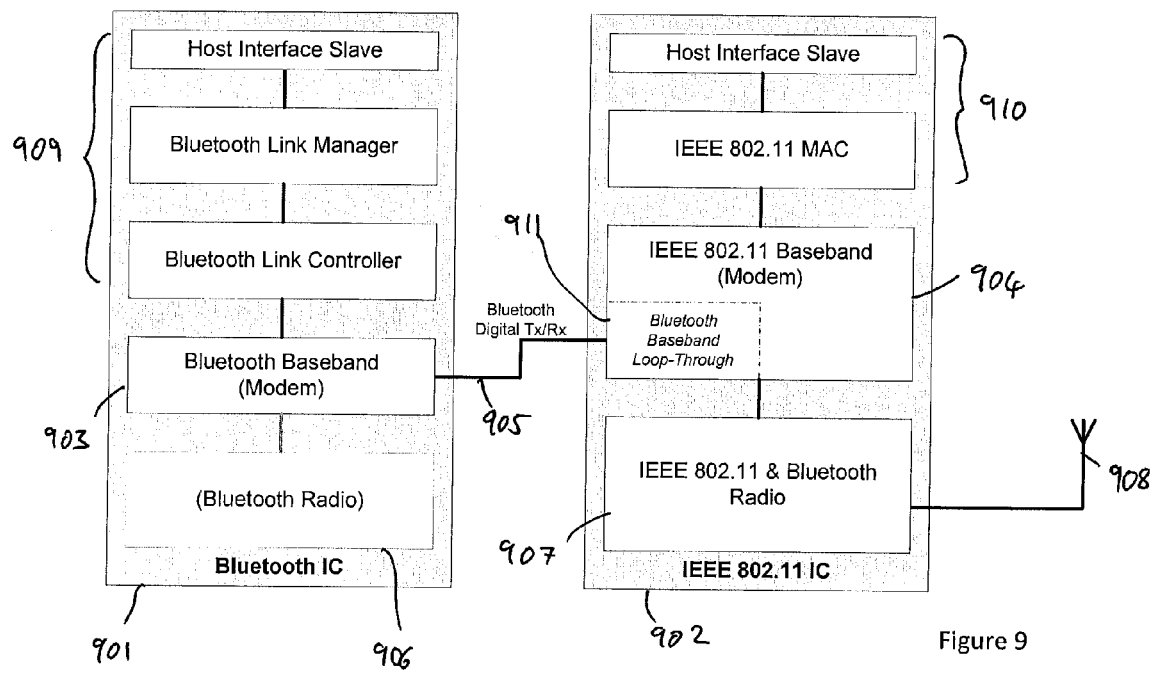
FIG. 9 is a schematic diagram of a communication device configured in accordance with an alternative embodiment of the present invention.

As an alternative to RF loop-through, digital baseband loop-through circuitry can instead be provided by one communication IC to another. This is shown in FIG. 9 in which an IEEE 802.11 IC 902 includes baseband loop-through circuitry 911 so as to provide a digital interface to Bluetooth IC 901. The Bluetooth IC need not therefore include any RF circuitry 906. Bluetooth modem 903 communicates over link 905 with the baseband loop-through by exchanging I/Q samples or other representations of RF signals. In this manner, the Bluetooth radio provides signals for transmission to the modem 904 of IC 902, and modem 904 provides received Bluetooth signals to modem 903 of the Bluetooth IC. No RF path need therefore exist between the two ICs and IC 901 can be purely digital. This avoids the increased complexity and power consumption of using a mixed signal process.

All RF processing is performed in IC 902 at radio frequency circuitry 907 which is configured to handle both Bluetooth and IEEE 802.11 radio signals. In the case of Bluetooth and IEEE 802.11b/g, which operate in the same 2.4 GHz ISM band, the signals are preferably combined at radio circuitry 907. More generally, depending on the frequency overlap between the two radio protocols the signals can either be combined digitally at modem 904, or in RF at circuitry 907. Higher level portions of the ICs 909 and 910 can operate in a conventional manner, or preferably over a shared interface in accordance with the second embodiment of the present invention.

If IC 901 includes radio circuitry 906, the radio circuitry may have a direct alternative connection to antenna 908 which it can use when IC 902 is powered down. Thus, IC 901 may be operable to select between communicating by means of the baseband loop-through provided by IC 902 and communicating using its own radio circuitry 906.

Figure 10:
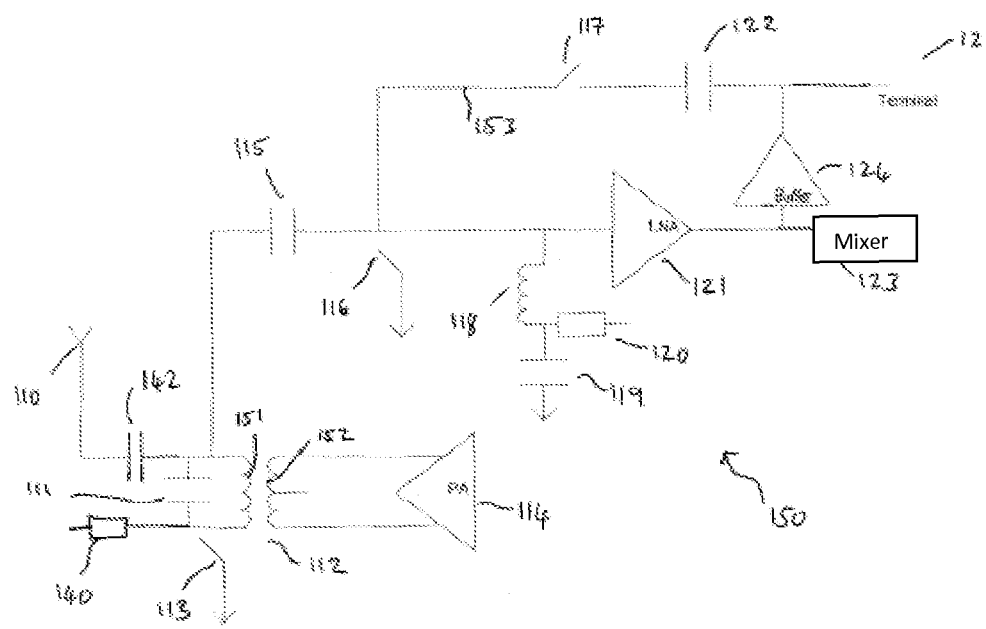
FIG. 10 is a schematic diagram of an RF loop-through circuit configured in accordance with the first embodiment of the present invention.

An RF loop-through circuit suitable for use in the first embodiment of the present invention is shown in FIG. 10. RF loop-through circuit 150 corresponds roughly to loop-through 304 in FIG. 3 and loop-through 405 in FIG. 4. However, note that certain components shown as part of RF loop-through circuit 150 in FIG. 10 could equally be considered to be part of the master transceiver—for example, power amplifier 114 and low noise amplifier (LNA) 121. All of the components shown in FIG. 10, with the exception of the antenna, can be provided at a master transceiver IC, such as transceiver 302 in FIG. 3 or transceiver 402 in FIG. 4. Terminal 125 (which could be provided at a pin of the master transceiver IC) provides receive and/or transmit loop-through to a slave transceiver IC, such as transceiver 301 in FIGS. 3 and 4. In the example shown in FIG. 10, the master transceiver providing the loop-through is an IEEE 802.11 chip and the slave transceiver is a Bluetooth chip connected at terminal 125. However, the transceivers could in fact be any kind of radio transceiver.

RF loop-through circuit 150 is operable to receive signals for transmission from the master transceiver at which it is located and to provide received signals to the master transceiver. The transmit and receive paths of the master transceiver are represented by power amplifier 114 and low noise amplifier 121, respectively. Transmit and receive signals for the slave transceiver for which the RF loop-through is provided are conveyed from and to the slave transceiver by means of terminal 125. The loop-through circuit is connected to antenna 110, which is preferably provided externally to the transceiver ICs.

It is advantageous if the radio transceiver having the greater transmit power is the master transceiver supporting the RF loop-through circuitry because it is more straightforward to provide the power amplifier of the master transceiver with a dedicated transmit path. This is the arrangement shown in FIG. 10: power amplifier 114 is coupled to the antenna by transformer 112, with switch 113 being arranged to allow the power amplifier to be decoupled from the antenna when the switch is open. The transformer comprises an output-side inductor 151 which is inductively coupled to an input-side inductor 152; the ratio of the inductances of these inductors defines the step-up or step-down ratio of the transformer. Generally, transformer 112 should be a step-down transformer so as to achieve the desired transmit power at the antenna. Biasing of inductor 112 may be achieved by means of optional resistor 140.

Capacitor 111, which is connected in parallel with transformer 112, is optional but when present can be used to tune out inductance 151 at the output side of the transformer when switch 113 is closed and the master transceiver is transmitting. The use of capacitor 111 aims to reduce the loss of transmitting power through switches 113 and 116. As a result the size of these switches can be reduced. Preferably capacitor 111 is a metal-oxide-metal (MOM) capacitor. In the absence of capacitor 111, capacitor 115 alone is available to tune out inductance 151.

A further optional capacitor 142 can be used to help protect switch 113 from electrostatic discharges and to avoid forward-biasing of switch 113 during transmission by the slave transceiver (i.e. in the example shown in the figures, in Bluetooth loop-through transmit mode).

The receive path for the master transceiver includes low noise amplifier 121 which is configured to provide amplified receive signals to mixer 123. Inductor 118 serves two purposes: firstly to complete the transition between the low impedance transmit path and the high impedance receive path and secondly to tune out the capacitances (e.g. capacitor 115) at the input of LNA 121. Inductor 118 is coupled to ground (or the relevant lower supply rail for the circuit) by means of capacitor 119. Biasing of inductor 118 may be achieved by means of optional resistor 120. Finally, a switch 116 is provided that is arranged so as to allow the receive path to be clamped to ground when the switch is closed.

The loop-through circuit is operable to convey radio frequency signals to and from the slave transceiver (in this example a Bluetooth IC) connected at terminal 125. Buffer 124 is configured to provide received radio signals from LNA 121 to terminal 125 whilst decoupling the loop-through receive path from the circuitry of the master receive path. A secondary receive/transmit path 153 for the slave transceiver is provided which bypasses the LNA and buffer. Path 153 is controlled by switch 117 and preferably includes a decoupling capacitor 122.

The operation of the RF loop-through circuit 150 will now be described for the transmit and receive modes of the master and slave transceivers.

When the master transceiver is transmitting radio frequency signals, switch 117 is open to isolate the secondary receive/transmit path, switch 116 is closed so as to clamp the receive path to ground and protect LNA 121 from the voltage output of the power amplifier, and switch 113 is closed so as to complete the circuit for transformer 112. This allows RF transmit signals from power amplifier 114 to be converted at transformer 112 to match the output of the master transceiver to antenna 110, and to pass along the transmission path for transmission at the antenna.

By opening switches 113 and 116 and 117, the loop-through circuitry is arranged to provide signals received at the antenna to the master and/or slave transceivers. In other words, the loop-through circuitry switches from a mode in which it is configured to transmit the RF signals from the master transceiver to a mode in which it is configured to provide RF signals received at the antenna to one or both of the master and slave transceivers. The master transceiver receives signals amplified at LNA 121 at its mixer 123. If buffer 124 is enabled, the loop-through circuitry can provide received signals via the buffer to terminal 125 for the slave transceiver.

The buffer is preferably configured to provide received signals at terminal 125 only when signals are being received for the slave transceiver, or when signals are not being received for the master transceiver. In other words, the loop-through circuit switches between providing RF signals received at the antenna to the master and slave transceivers. This is preferable because the performance of the loop-through is improved if LNA 121 is switched between two states in dependence on which transceiver the loop-through circuit is providing received signals to: a first state in which the LNA is tuned to the RF signals received for the master transceiver and a second state in which the LNA is tuned to the RF signals received for the slave transceiver. The LNA could, for example, be tuned by a set of switchable capacitances.

RF loop-through circuit 150 can also be configured in a passive receive mode to provide signals received at the antenna to the slave transceiver over secondary path 153. In this mode, switch 117 is closed so as to connect the secondary receive path to the antenna and buffer 124 is disabled. Capacitor 115, inductor 118 and capacitor 122 form a T-network which is configured to match the impedance at terminal 125 (typically 50 Ohm). This passive receive mode provides an alternative path over which received signals can be provided to the slave transceiver. If the passive receive mode is used, buffer 124 need not be present.

Finally, the loop-through circuit can be configured in a mode which allows the slave transceiver to transmit RF signals over antenna 110. In this mode, switch 117 is closed so as to couple terminal 125 to the antenna, switch 116 is open, and switch 113 is open so as to minimise the losses and noise introduced due to transformer 112. Thus the switches are set in the same manner as for the passive receive mode and the T-network formed by components 115, 118 and 122 provides the same impedance matching between the terminal 125 and the antenna 110. However, in transmit mode it is advantageous if a suitable DC bias voltage is applied by means of resistor 120 in order to avoid forward-biasing switch 116 and a suitable DC bias voltage is applied by means of resistor 140 in order to avoid forward-biasing switch 113.

It is advantageous if IC switches 113, 116 and 117 are large enough that they do not have to be forward-biased in order to cope with the typical voltage swings present on the receive and transmit paths. For example, for a power supply voltage of around 2.5V, the switches should be hardy to voltage swings of around +/−0.5V. On the other hand, it is important that the switches are no larger than is necessary to meet this requirement so that the parasitic capacitances of the switches do not overly degrade the performance of the circuit.

Typically, LNA 121 will have a higher impedance at the operating frequencies than the antenna (e.g. 70 Ohm versus 50 Ohm at the antenna). Capacitor 115 and inductor 118 are provided to perform the low-to-high impedance conversion and smooth the impedance match between the receive path and the antenna.

Figure 11:
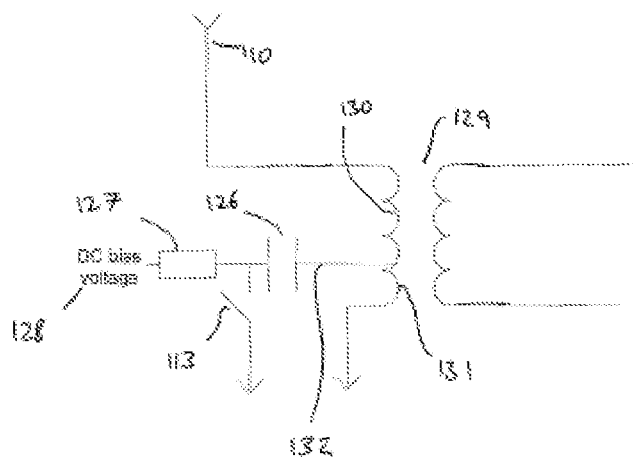
FIG. 11 is a schematic diagram of part of an RF loop-through circuit which provides an alternative arrangement to that shown in FIG. 10.

FIG. 11 shows an alternative arrangement for transformer 112 and switch 113 for the loop-through circuit shown in FIG. 10. Transformer 129 provides a tap 132 at the output side of transformer 129. The tap splits the inductance at the output side of the transformer into a first inductance 130 and a second inductance 131, as shown in FIG. 11. The total inductance at the output side of the transformer is the sum of inductances 130 and 131. A capacitor 126 is connected at tap 132 and switch 113 for enabling the transmit path is now connected between the capacitor and ground.

The operation of switch 113 is now reversed: during transmission from power amplifier 114 switch 113 is open and in all other modes switch 113 is closed. Inductance 131 and capacitor 126 form a parallel network that isolate the transmission path during the other modes of operation. Preferably a DC bias voltage 128 is provided by means of resistor 127 in order to protect switch 113 and prevent signal clipping. The alternative arrangement shown in FIG. 11 has the advantage that the capacitances of switch 113 can be tuned out by inductance 131.

Figure 12:
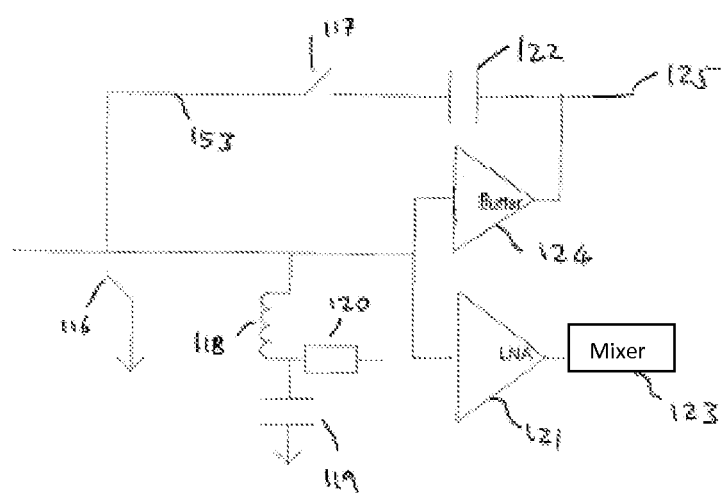
FIG. 12 is a schematic diagram of part of an RF loop-through circuit which provides an alternative arrangement to that shown in FIG. 10.

FIG. 12 shows an alternative arrangement for the LNA 121 and buffer 124 for the loop-through circuit shown in FIG. 10. LNA 121 and buffer 124 are instead arranged in parallel, which allows the design requirements for the buffer and LNA to be relaxed. Buffer 124 in FIG. 12 could optionally include an LNA for providing amplified signals to the slave transceiver connected at terminal 125. LNA 121 is arranged to provide its output to mixer 123 and not to buffer 124 for the slave transceiver.

Note that the master and slave transceivers need not both be capable of both transmitting and receiving RF signals. If the master transceiver is not capable of one of transmit or receive then the respective unnecessary components shown in FIGS. 10 to 12 need not be present. If the slave transceiver is not capable of one of transmit or receive then the respective unnecessary components shown in FIGS. 10 to 12 need not be present.

The present invention enables multiple transceiver ICs to be packaged together or provided together on a PCB and appear to behave as a single combination IC. Either or both of the RF and host interfaces may be unified so as to combine the functionalities of the ICs. In the preferred embodiments of the present invention, only one of the ICs requires modification in accordance with the teachings described herein; the 'slave' ICs do not need to be modified and can be stock discrete ICs. The present invention further allows all of the ICs to retain independent functionality such that each IC (and the communication protocol it supports) can be used independently as well as part of the collective chip presented by a 'proxy' IC configured in accordance with the teachings of the present invention.

In comparison to providing multiple communication protocols at a device by using discrete ICs, the present invention reduces the number of external RF components required to allow antenna sharing and it enables the sharing of host interfaces that would not otherwise support multiple devices connected to a single host (such as SDIO).

The present invention retains the benefits of using discrete ICs without their disadvantages. In comparison to combination ICs supporting multiple communication protocols, discrete ICs are less complex and can therefore be designed and brought to market more quickly, providing better tracking of standards and market requirements. Furthermore, product designers can pick-and-mix ICs for the ideal combination of transceiver implementations in a device rather than being restricted to the combinations that have been included in combination ICs. Perhaps most importantly, separate ICs generally provide improved RF performance due to the physical isolation between the transceivers. And finally, the present invention allows all ICs except those providing I/O functions to be independently switched off to reduce power consumption when their transceivers are not required.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An integrated circuit comprising: a digital interface for connection to a host controller;
    an antenna connection for connection to an antenna;
    a radio frequency transceiver for communicating data in accordance with a first radio communication protocol, the radio frequency transceiver being configured to communicate radio frequency signals over the antenna connection in response to data exchanged over the digital interface; and
    radio loop-through circuitry configured to exchange radio frequency signals according to a second radio communication protocol with another collocated integrated circuit, the radio loop-through circuitry being configured to provide radio frequency signals according to the second radio communication protocol received at the antenna connection to an output connection of the integrated circuit, wherein the first radio communication protocol is different from the second radio communication protocol;
    wherein the radio loop-through circuitry is further configured to provide radio frequency transmit signals received at an input connection of the integrated circuit from the said another integrated circuit, to the antenna connection.

2. An integrated circuit as claimed in claim 1, wherein the input and output connections are one and the same.

3. An integrated circuit as claimed in claim 1, wherein the radio loop-through circuitry further comprises a low noise amplifier configured to amplify radio frequency signals received at the antenna connection for the radio frequency transceiver.

4. An integrated circuit as claimed in claim 1, wherein the radio loop-through circuitry is configured to selectively provide signals received at the antenna to the output connection or the radio frequency transceiver, the radio frequency transceiver being selected only when radio frequency signals for the radio frequency transceiver are being received over the antenna.

5. An integrated circuit as claimed in claim 1, wherein the loop-through circuitry further comprises a buffer amplifier between the antenna and the output connection such that received radio frequency signals are provided to the output connection by means of the buffer amplifier.

6. An integrated circuit as claimed in claim 1, wherein the radio loop-through circuitry further comprises a low noise amplifier configured to amplify radio frequency signals received at the antenna connection and provide the amplified signals at both the output connection and the radio frequency transceiver.

7. An integrated circuit as claimed in claim 1, wherein the radio loop-through circuitry is configured to provide radio frequency signals received at the antenna connection to the output connection when the integrated circuit is in a low power mode.

8. An integrated circuit as claimed in claim 1, wherein the radio loop-through circuitry further comprises one or more switches operable to select between transmit signals received at the input connection and transmit signals from the radio frequency transceiver, the selected transmit signals being exclusively provided to the antenna connection.

9. An integrated circuit as claimed in claim 8, wherein the switches are configured to select transmit signals from the radio frequency transceiver when the transceiver has signals to transmit.

10. An integrated circuit as claimed in claim 9, wherein the said switches are configured to select transmit signals received at the input connection when an integrated circuit is in a low power mode.

11. An integrated circuit as claimed in claim 9, wherein the said switches are further configured to provide radio frequency signals received at the antenna connection to the output connection when the integrated circuit is in a low power mode.

12. An integrated circuit as claimed in claim 1, wherein the radio loop-through circuitry further comprises a radio frequency mixer configured to combine transmit signals received at the input connection and transmit signals from the radio frequency transceiver.

13. An integrated circuit as claimed in claim 1, wherein the radio loop-through circuitry is operable to exchange radio frequency signals with one or more additional other integrated circuits.

14. An integrated circuit as claimed in claim 1, wherein the radio frequency transceiver comprises a power amplifier configured to amplify signals for transmission over the antenna and the radio loop-through circuitry comprises a transformer arranged to couple the output of the power amplifier to the antenna.

15. An integrated circuit as claimed in claim 1, wherein the digital interface is further configured to present first and second function sets and the integrated circuit further comprises interface loop-through circuitry for exchanging digital data with said other integrated circuit, the interface loop-through circuitry being configured to:
provide commands of the second function set received at the digital interface at a loop-through interface connection; and
provide responses received at the loop-through interface connection to the digital interface as responses of the second function set.

16. An electronic device comprising: an antenna; a host controller;
a first integrated circuit comprising
a digital interface for connection to a host controller;
an antenna connection for connection to an antenna;
a radio frequency transceiver for communicating data in accordance with a first radio communication protocol, the radio frequency transceiver being configured to communicate radio frequency signals over the antenna connection in response to data exchanged over the digital interface; and
radio loop-through circuitry configured to exchange radio frequency signals according to a second radio communication protocol with another collocated integrated circuit, the radio loop-through circuitry being configured to provide radio frequency signals according to the second radio communication protocol received at the antenna connection to an output connection of the integrated circuit; and
a second integrated circuit, wherein the digital interface of the first integrated circuit is a first digital interface that is coupled to the host controller, the radio frequency transceiver of the first integrated circuit is a first radio frequency transceiver and the another collocated integrated circuit is the second integrated circuit; and
the second integrated circuit comprises a second radio frequency transceiver for communicating data in accordance with a second radio communication protocol, the second radio frequency transceiver being configured to receive radio frequency signals according to the second radio communication protocol from the antenna through by means of the radio loop-through circuitry of the first integrated circuit,
wherein the first radio communication protocol is different from the second radio communication protocol;
wherein the second radio frequency transceiver of the second integrated circuit is further configured to transmit radio frequency signals over the antenna by means of the radio loop-through circuitry, the radio loop-through circuitry of the first integrated circuit being configured to cause the transmission of radio frequency transmit signals received from the second integrated circuit over the antenna.

17. An electronic device as claimed in claim 16, wherein the first and second integrated circuits are provided in a single package.

18. An electronic device as claimed in claim 16, further comprising an independent connection between the second integrated circuit and the antenna so as to allow the second integrated circuit to receive radio frequency signals when the first integrated circuit is in a low power state.

19. An electronic device as claimed in claim 18, further comprising one or more switches provided between the antenna and the first integrated circuit and the antenna and the independent connection of the second integrated circuit, the one or more switches being arranged to select between the first and second integrated circuits such that the radio frequency transmit signals of the selected integrated circuit are exclusively provided to the antenna.

20. An electronic device as claimed in claim 16, wherein the radio loop-through circuitry further comprises a switch configured to isolate the second integrated circuit from the first integrated circuit when the first integrated circuit is powered down.

21. An electronic device as claimed in claim 16, further comprising:
clock generation circuitry at each of the first and second integrated circuits;
a clock arranged to provide a reference clock to the clock generation circuitry at the first and second integrated circuits;
clock request loop-through circuitry at the first integrated circuit configured to forward clock requests received from the clock generation circuitry of the second integrated circuit to the clock.

22. An electronic device as claimed in claim 16, further comprising:
- at the first integrated circuit, interface loop-through circuitry for exchanging digital data with the second integrated circuit;
- at the second integrated circuit, a second digital interface coupled to the interface loop-through circuitry;
- wherein the first digital interface of the first integrated circuit is further configured to present first and second function sets and the interface loop-through circuitry is configured to:
- to the second integrated circuit, provide commands of the second function set received at the first digital interface from the host controller; and
- to the host controller, provide responses received from the second integrated circuit as responses of the second function set.

23. An electronic device as claimed in claim 22, wherein the first digital interface of the first integrated circuit is further configured to present a third function set and (a) the first radio frequency transceiver is responsive to commands of the third function set received from the host controller, and (b) the interface loop-through circuitry is configured to provide commands of the third function set received from the host controller to the second integrated circuit.

24. An electronic device as claimed in claim 23, wherein the interface loop-through circuitry is configured to hold data relating to the state of the second digital interface and, in response to one or more predetermined commands of the third function set, respond on behalf of the second integrated circuit to the host controller.

25. An electronic device as claimed in claim 23, wherein the third function set is a global function set for controlling the first and second digital interfaces.

26. An electronic device as claimed in claim 16, wherein the digital interfaces are SDIO interfaces and the host controller is an SDIO host controller.

* * * * *